May 31, 1955     C. J. G. VAN DER KLEIJ     2,709,389

THERMOPLASTIC SCREW ANCHOR

Filed Nov. 3, 1950

Inventor
CORNELIS JOHANNES GERARDUS VAN DER KLEIJ

By

Attorney

United States Patent Office 2,709,389
Patented May 31, 1955

2,709,389

THERMOPLASTIC SCREW ANCHOR

Cornelis Johannes Gerardus van der Kleij, The Hague, Netherlands, assignor to H. J. van der Rijn N. V., Amsterdam, Netherlands, a corporation of the Netherlands Application November 3, 1950, Serial No. 193,803

Claims priority, application Netherlands November 11, 1949

1 Claim. (Cl. 85—2.4)

This invention relates to improvements in thermoplastic screw anchors of the kind to be inserted in prepared holes in walls, floors, ceilings, and other surfaces, especially those of hard construction material such as brick, plaster, and concrete. As is well known, such plugs are used to receive screws or nails which otherwise are not readily driven into and retained by such relatively un-nailable surfaces.

Wall plugs have hitherto been made of fibrous material or of a soft metal, such as lead, but these known types are not entirely satisfactory. Fibrous material is not moistureproof and plugs made of it tend to disintegrate or rust the screws or nails driven into it; lead plugs are so soft they are easily deformed when driven into the prepared holes, and they do not provide a secure anchorage for the screw. To prevent plugs of these kinds from being driven completely through hollow walls, it has been suggested to provide them with flanges at their outer ends, and, to give them a mechanical expansibility, to provide them with several longitudinal radial slots along a portion of their length.

The present invention has for its object the provision of wall plugs of uniform tubular form which are adapted to expand into prepared holes and hence to grip tightly the walls of the said holes.

More particularly, the invention provides uniformly tubular wall plugs composed of thermoplastic material which is hard and rigid at ordinary temperatures, but which softens under the frictional heat generated when a screw or nail is driven therein and resets to a hard rigid state when again cold.

A still further object of the invention consists in providing a tubular wall plug of the above described character which is irradially slit along its entire length. Such a slit plug may be compressed or rolled up slightly to fit into prepared holes of less diameter than the tube itself, and hence, on release of the pressure, to spring open to tightly engage the entire cylindrical wall of the hole. It may also be placed in holes of larger bore than its external diameter and thus engage the greater part of the bore hole surface.

Further objects will be apparent from the following description.

The preferred material employed in the construction of the wall plugs of this invention is a thermoplastic resin of suitable elasticity and tenacity for the purposes in question and one which is hard and rigid at ordinary temperatures.

Suitable thermoplastic resins from which wall plugs in accordance with this invention may be made include the polyvinyl resins, such as polyvinyl chloride and polystyrene, other polyvinyl esters and their co-polymers; also other thermoplastic resins such as the polyethylenes, nylon, and cellulose esters and ethers, etc.

Experiments made on plugs of polyvinyl chloride have shown that a screw can be easily screwed by hand into the plug and taps a very accurate and deep thread in the cylindrical wall surrounding the central channel. Placed within a fitting bore hole, the plug is radially expanded by the screw engaged therein and is thus pressed with great force against the walls of this hole and is so secured therein as to be completely immovable. Due to the heat developed by screwing in the screw, the material becomes more or less plastic and is forced deeply between the screw threads. In contrast with lead, the material is, however, so hard at normal temperature that the screw threads formed therein offer a very great resistance against extraction of the screw. The tapped screw thread is as deep and exact as that of an ordinary nut. Therefore, a plug according to the invention permits the screw to be repeatedly screwed in and out, without damaging the threads, which is not possible with any of the existing plugs. It is practically impossible to overturn the screw in the plug, even when the point of the screw meets a considerable resistance, e. g., when it abuts against the end of the bore hole.

The invention will now be described with reference to the accompanying drawing in which is illustrated a preferred embodiment thereof.

In the drawing.

In the drawings like reference numerals refer to the same parts.

Figure 1:
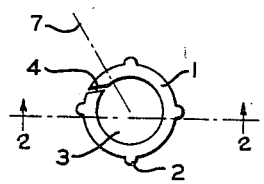
Fig. 1 is an end view of a preferred form of the plug embodying this invention.
Figure 4:
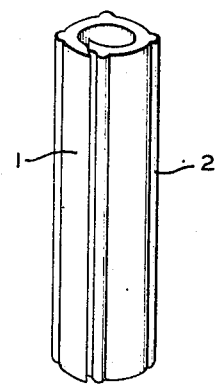
Fig. 4 is a corresponding perspective side view thereof.

The plug according to Figs. 1 and 4, inclusive, consists of a cylindrical tube 1 of thermoplastic material, such as, polyvinyl chloride, which is externally provided with four longitudinal ribs 2. The central channel 3 has a smooth cylindrical wall.

When applying wall plugs, it often happens that the proposed bore hole is too narrow or too wide, having regard to the outer diameter of the plug. Known tubular wall plugs cannot readily be inserted in such holes.

This drawback is obviated in accordance with this invention by providing the plug with a slit extending throughout its length and traversing the wall of the plug body in a direction which diverges from the radial direction. Thus, the longitudinal edges of the tubular wall of the plug body, which are formed by the slit, adjoin each other with an inclined surface of contact, and said edges are able to slide along each other, so that the plug can be reduced in diameter by exerting a slight pressure thereupon, in order to permit an easy insertion of the plug into a too narrow bore hole. Moreover, the expansibility of the plug is increased, since the edges of the longitudinal slit can also be separated from each other.

Figure 3:
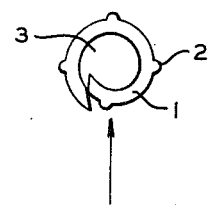
Fig. 3 is an end view of the plug shown in Figs. 1 and 2 in partially compressed or rolled up condition.
Figure 2:
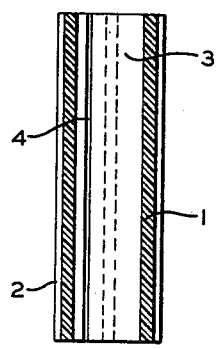
Fig. 2 is a longitudinal section taken on line 2—2 of Fig. 1.

Accordingly, the tubular plug 1 is provided with a longitudinal slit 4 extending throughout the entire length of the plug and traversing the wall of the plug in a direction divergent from the radius 7. The edges of the slit 4 thus adjoin each other with an inclined surface of contact and are, therefore, capable of easily sliding along each other as shown in Figs. 3 and 4 in order to reduce the outer diameter of the plug. This is effected by exerting at the place of the slit a slight pressure on the one plug half (in the direction of the arrow on Fig. 3). The plug can thus then be inserted into a narrow bore hole without any difficulties.

A fastening screw, when applied, immediately taps a thread in the wall of the plug. Because of the resilience of the plug, due to the longitudinal slit, as well as by the thermoplastic properties of the material, the plug is caused to expand and to firmly hold against the walls of the bore hole, and the ribs 2 grip the walls of the bore hole to prevent turning of the plug in the latter. Due to the heat developed by screwing in the fastening screw, the plastic material is forced deeply between the screw threads and at the place of the slit the material is welded again together. The screw thread tapped in the cylindrical wall of the plug is as exact as that of an ordinary nut, so that the screw can be repeatedly screwed in and out without damaging the thread.

In a bore hole which is somewhat too wide, the plug has an excellent grip due to the fact that it is easily expansible in consequence of the longitudinal slit. The plug according to this invention thus permits a very large play in the dimensions of the bore holes.

The angle formed by the slit 4 with the radius 7 is preferably at least 45°. The external shape may, of course, be polygonal (not shown) instead of cylindrical with the ribs 2 thereon, as provided in the illustrated form of the invention.

The plugs of this invention can be readily manufactured by known extrusion processes to form tubular pieces of any suitable length, which can then be cut into appropriate pieces and slit longitudinally.

It is understood that the invention is not limited to the foregoing specific embodiment and that modifications will occur to those skilled in the art without departing from the spirit and scope of the invention as defined in the following claim.

I claim:

A wall plug for insertion in a wall hole to provide a firm seating for a screw threaded therein; said plug being of solid synthetic resinous thermoplastic material and comprising a longitudinally slit tubular body of uniform cross section throughout its length with a smooth uniform central bore of circular cross section extending completely therethrough, said slit traversing the wall of the plug at a substantial angle to the radius thereof and extending the whole length of the body so that the longitudinal edges of the body at said slit can be spread apart and overlapped to accommodate the plug to wall holes of different diameters.

References Cited in the file of this patent

UNITED STATES PATENTS

| | | |
|---|---|---|
| 54,113 | Clark | Apr. 24, 1866 |
| 1,516,652 | Tomkinson | Nov. 25, 1924 |
| 2,088,955 | Hamill | Aug. 3, 1937 |

FOREIGN PATENTS

| | | |
|---|---|---|
| 1,694 of 1862 | Great Britain | June 5, 1862 |
| 589,648 | Great Britain | June 26, 1947 |
| 659,939 | Germany | May 17, 1938 |